(12) United States Patent
Nolan

(10) Patent No.: US 7,282,278 B1
(45) Date of Patent: Oct. 16, 2007

(54) TILTED RECORDING MEDIA WITH L10 MAGNETIC LAYER

(75) Inventor: Thomas Patrick Nolan, Mountain View, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 347 days.

(21) Appl. No.: 10/766,920

(22) Filed: Jan. 30, 2004

Related U.S. Application Data (60) Provisional application No. 60/651,458, filed on Jul. 2, 2003.

(51) Int. Cl.
G11B 5/66 (2006.01)
G11B 5/70 (2006.01)

(52) U.S. Cl. ................................. 428/831.2

(58) Field of Classification Search ............. 428/831.2, 428/832, 832.1
See application file for complete search history.

(56) References Cited

U.S. PATENT DOCUMENTS

| | | | |
|---|---|---|---|
| 4,980,875 A | 12/1990 | Ishiwata et al. | |
| 5,236,791 A | 8/1993 | Yahisa et al. | |
| 5,363,794 A | 11/1994 | Lairson et al. | |
| 5,468,670 A | 11/1995 | Ryou | |
| 5,603,766 A | 2/1997 | Visokay et al. | |
| 5,824,409 A | 10/1998 | Sellmyer et al. | |
| 5,989,728 A | 11/1999 | Coffey et al. | |
| 6,007,623 A | 12/1999 | Thiele et al. | |
| 6,033,536 A | 3/2000 | Ichihara et al. | |
| 6,068,739 A | 5/2000 | Suzuki et al. | |
| 6,936,353 B1* | 8/2005 | Wu et al. | 428/611 |
| 2002/0098381 A1 | 7/2002 | Coffey et al. | |
| 2005/0134988 A1* | 6/2005 | Nakamura et al. | 360/55 |
| 2006/0002026 A1* | 1/2006 | Stipe et al. | 360/135 |
| 2006/0024530 A1* | 2/2006 | Nolan | 428/827 |

OTHER PUBLICATIONS

Chen et al., Effect of Pt buffer layer on structural and magnetic properties of FePt thin films, J Appl Phys, vol. 93, No. 3, Feb. 2003, pp. 1661-1665.*

Gao et al., Magnetic recording configuration for densities beyond 1 Tb/in2 and data rates beyond 1 Gb/s, IEEE, Trans Magn, vol. 38, No. 6, Nov 2002, pp. 3675-3683.*

Jeong et al., Controlling the crystallographic orientation in ultrathin L1- FePt (111) films on MgO(111) underlayer, IEEE Trans Magn, vol. 37, No. 4, Jul. 2001, pp. 1268-1270.*

* cited by examiner

*Primary Examiner*—Holly Rickman
(74) *Attorney, Agent, or Firm*—Darby & Darby P.C.

(57) ABSTRACT

A magnetic recording medium having a magnetic layer with an $L_{10}$ structure and an easy magnetization axis lying about 35° out-of-plane of the magnetic layer is disclosed. This medium has very high coercivity (Hc) and anisotropy field (Hk), giving rise to improved thermal stability. Combined with improved writability of the canted magnetic easy axis, this media enables improved recording signal-to-noise ratio (SNR).

17 Claims, 6 Drawing Sheets

Carbon overcoat

Magnetic layer with $L1_0$ structure

Underlayer with fcc structure

Amorphous seed layer

Substrate

Figure 1 (Prior art).

Protective overcoat 23

Magnetic layer 22

Underlayer 21

Substrate 20

Underlayer 21'

Magnetic layer 22'

Protective overcoat 23'

Figure 2 (Prior art).

FIG. 3(b) {10$\bar{1}$1}

FIG. 3(d) {0002}

FIG. 3(a) {10$\bar{1}$0}

FIG. 3(c) {11$\bar{2}$0}

TILTED RECORDING MEDIA WITH L10 MAGNETIC LAYER

RELATED APPLICATIONS

This application claims benefit from Provisional Application Ser. No. 60/651,458, requested for conversion into a provisional application on Jul. 28, 2003, from application Ser. No. 10/611,663, filed Jul. 2, 2003, the entire disclosures of the above mentioned applications are hereby incorporated herein by reference.

FIELD OF INVENTION

This invention relates to magnetic recording media, such as thin film magnetic recording disks, and to a method of manufacturing the media. The invention has particular applicability to high areal density longitudinal magnetic recording media having very low medium noise.

BACKGROUND

Magnetic discs and disc drives provide quick access to vast amounts of stored information. Both flexible and rigid discs are available. Data on the discs is stored in circular tracks and divided into segments within the tracks. Disc drives typically employ one or more discs rotated on a central axis. A magnetic head is positioned over the disc surface to either access or add to the stored information. The heads for disc drives are mounted on a movable arm that carries the head in very close proximity to the disc over the various tracks and segments.

Figure 1:
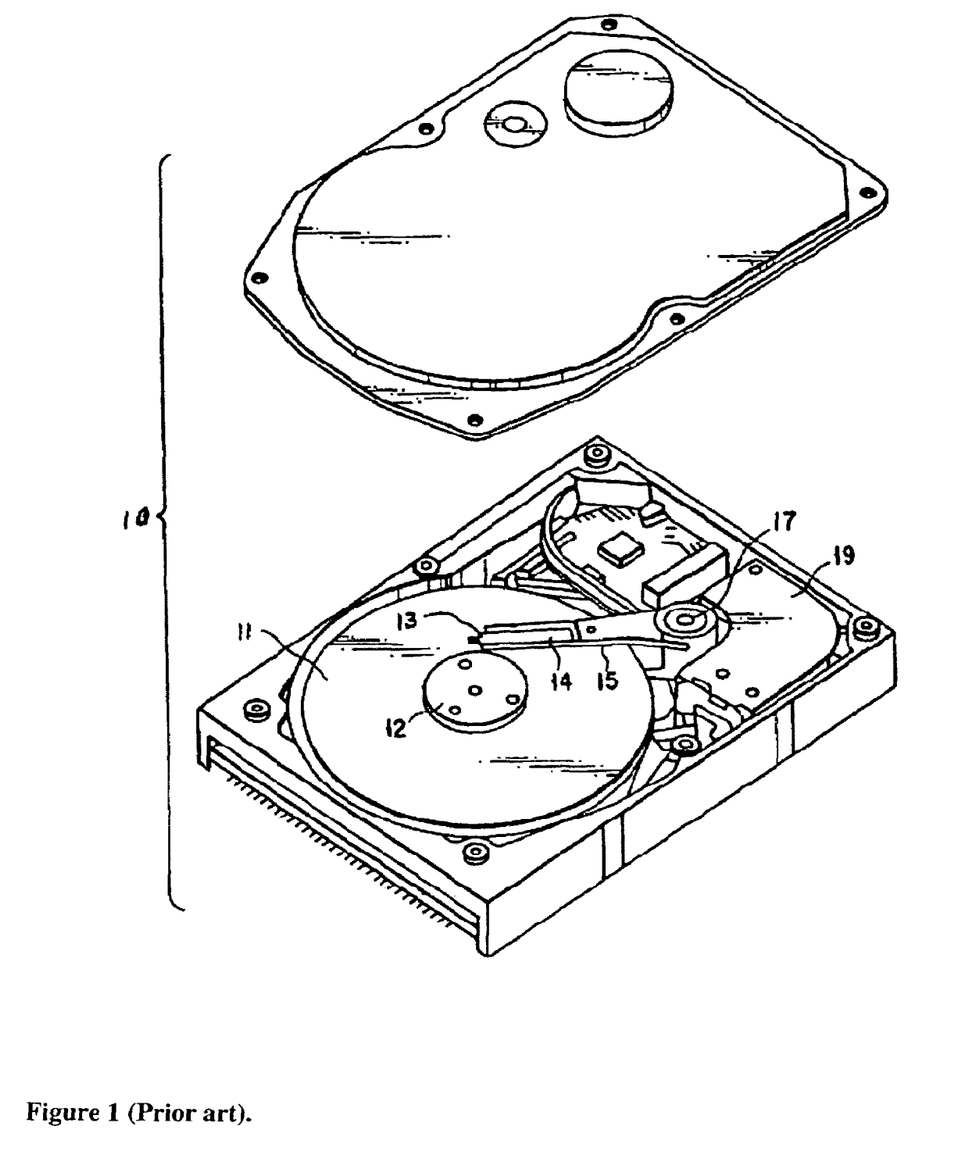
FIG. 1 is a view of a magnetic disk drive.

FIG. 1 shows the schematic arrangement of a magnetic disk drive 10 using a rotary actuator. A disk or medium 11 is mounted on a spindle 12 and rotated at a predetermined speed. The rotary actuator comprises an arm 15 to which is coupled a suspension 14. A magnetic head 13 is mounted at the distal end of the suspension 14. The magnetic head 13 is brought into contact with the recording/reproduction surface of the disk 11. A voice coil motor 19 as a kind of linear motor is provided to the other end of the arm 15. The arm 15 is swingably supported by ball bearings (not shown) provided at the upper and lower portions of a pivot portion 17.

Figure 2:
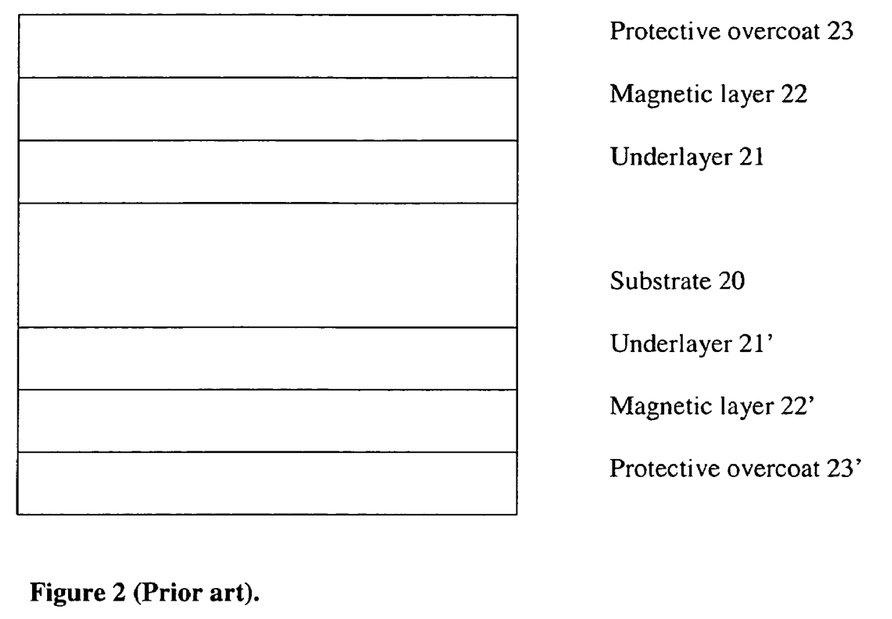
FIG. 2 is a schematic representation of the film structure in accordance with a magnetic recording medium of the prior art.
Figure 3A:
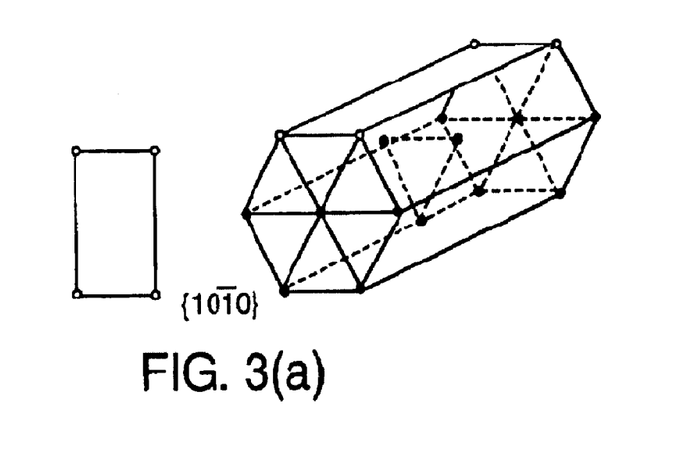
FIG. 3 shows crystal lattice planes of a hexagonal closed packed structure.
Figure 3B:
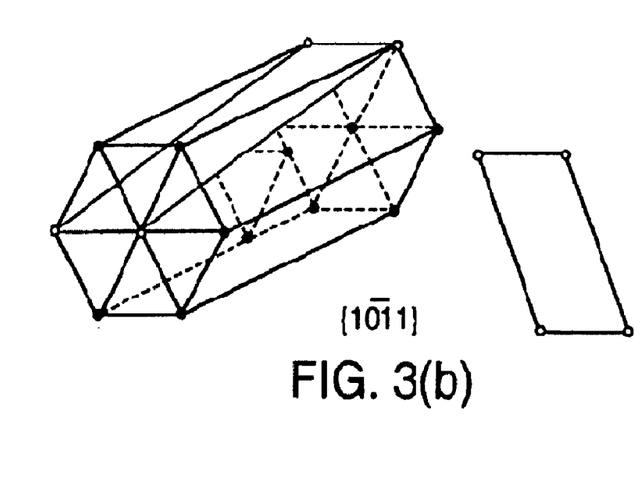
Figure 3C:
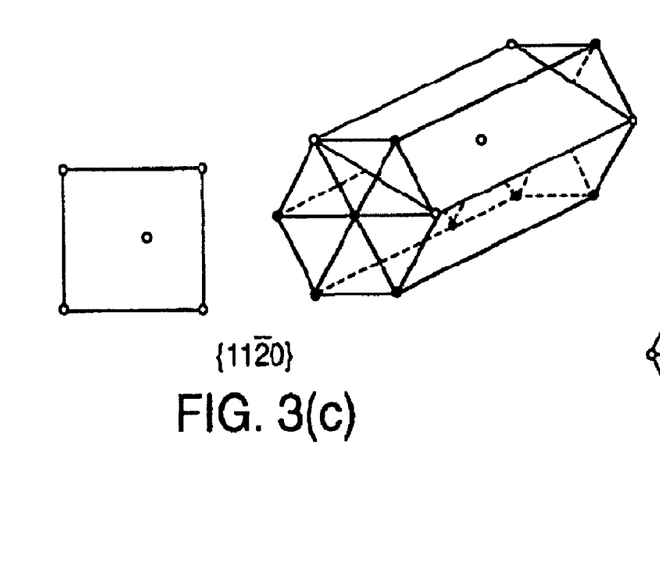
Figure 3D:
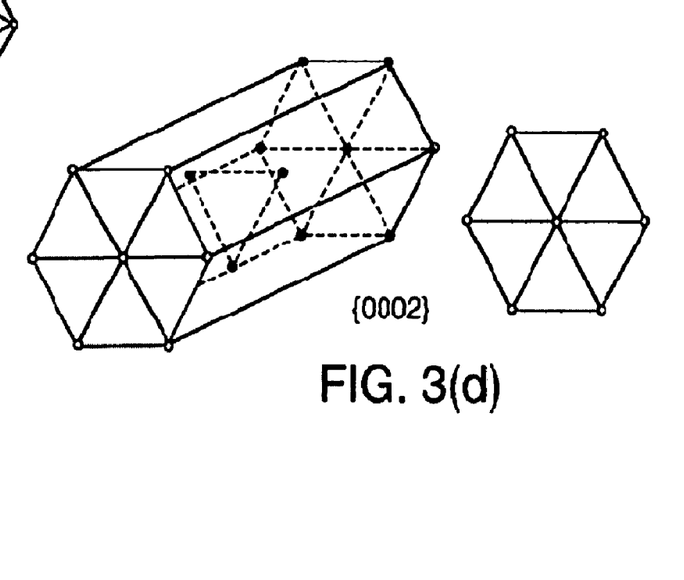

A cross sectional view of a longitudinal recording disk medium is depicted in FIG. 2. A longitudinal recording medium typically comprises a non-magnetic substrate 20 having sequentially deposited on each side thereof an underlayer 21, 21', such as chromium (Cr) or Cr-containing, a magnetic layer 22, 22', typically comprising a cobalt (Co)-base alloy, and a protective overcoat 23, 23', typically containing carbon. General practices also comprise bonding a lubricant topcoat (not shown) to the protective overcoat. Underlayer 21, 21', magnetic layer 22, 22', and protective overcoat 23, 23', are typically deposited by sputtering techniques. The Co-base alloy magnetic layer deposited by techniques normally comprises polycrystallites epitaxially grown on the polycrystal Cr or Cr-containing underlayer.

A longitudinal recording disk medium is prepared by depositing multiple layers of films to make a composite film. In sequential order, the multiple layers typically comprise a non-magnetic substrate, one or more underlayers, one or more magnetic layers, and a protective carbon layer. Generally, a polycrystalline epitaxially grown cobalt-chromium (CoCr) alloy magnetic layer is deposited on a chromium or chromium-alloy underlayer.

Methods for manufacturing a longitudinal magnetic recording medium with a glass, glass-ceramic, Al or Al—NiP substrate may also comprise applying a seed layer between the substrate and underlayer. A seed layer seeds the nucleation of a particular crystallographic texture of the underlayer. A seed layer is the first deposited layer on the non-magnetic substrate. The role of this layer is to texture (alignment) the crystallographic orientation of the subsequent Cr-containing underlayer.

Conventionally, the seed layer, underlayer, and magnetic layer are sequentially sputter deposited on the substrate in an inert gas atmosphere, such as an atmosphere of argon. A carbon overcoat is typically deposited in argon with nitrogen, hydrogen or ethylene. Lubricant topcoats are typically about 20 Å thick.

A substrate material conventionally employed in producing magnetic recording rigid disks comprises an aluminum-magnesium (Al—Mg) alloy. Such Al—Mg alloys are typically electrolessly plated with a layer of NiP at a thickness of about 10 microns to increase the hardness of the substrates, thereby providing a suitable surface for polishing to provide the requisite surface roughness or texture.

Other substrate materials have been employed, such as glass, e.g., an amorphous glass, glass-ceramic material that comprises a mixture of amorphous and crystalline materials, and ceramic materials. Glass-ceramic materials do not normally exhibit a crystalline surface. Glasses and glass-ceramics generally exhibit high resistance to shocks.

Longitudinal magnetic recording media having Cr<200> and Co<11.0> crystallographic preferred growth orientations (hereafter orientations) are usually referred as bi-crystal media, and are commonly used in the industry. Here, Cr<200> refers to bcc (body centered cubic) structured Cr-alloy underlayer or B2-structured underlayer with <200> preferred orientation. Typical bi-crystal media comprise Cr-containing alloy underlayers and Co-alloy magnetic layers. Cr-containing alloy has body centered cubic crystalline structure. Uni-crystal media, which have Co<10.0> preferred orientations and randomly oriented media have also been used. Perpendicular magnetic recording media having Co<0002> preferred orientation are also being used. All of these media types typically have at least one small grain, hexagonal-closed-packed (hcp) Co-alloy magnetic layer with low exchange coupling.

The increasing demands for higher areal recording density impose increasingly greater demands on thin film magnetic recording media in terms of coercivity (Hc); remanent coercivity (Hr); magnetic remanance (Mr), which is the magnetic moment per unit volume of ferromagnetic material; coercivity squareness (S*); signal-to-medium noise ratio (SMNR); and thermal stability of the media. These parameters are important to the recording performance and depend primarily on the microstructure of the materials of the media. For example, decreasing the grain size or reducing exchange coupling between grains, can increase SMNR, but it has been observed that the thermal stability of the media often decreases.

The requirements for high areal density, e.g. higher than 100 Gb/in$^2$, impose increasingly greater requirements on magnetic recording media in terms of coercivity, remanent squareness, medium noise, track recording performance and thermal stability. It is extremely difficult to produce a magnetic recording medium satisfying such demanding requirements, particularly a high-density magnetic rigid disk medium for longitudinal and perpendicular recording.

As the storage density of magnetic recording disks has increased, the product of Mr and the magnetic layer thickness (t) has decreased and Hr of the magnetic layer has increased. This has led to a decrease in the ratio Mrt/Hr. To achieve a reduction in Mrt, the thickness t of the magnetic layer has been reduced, but only to a limit because the magnetization in the layer becomes susceptible to thermal decay.

Medium noise in thin films is a dominant factor restricting increased recording density of high-density magnetic hard disk drives, and is attributed primarily to inhomogeneous grain size and intergranular exchange coupling. Accordingly, in order to increase linear density, medium noise must be minimized by suitable microstructure control.

Longitudinal magnetic recording media containing cobalt (Co) or Co-based alloy magnetic films with a chromium (Cr) or Cr alloy underlayer deposited on a non-magnetic substrate have become the industry standard. For thin film longitudinal magnetic recording media, the desired crystallized structure of the Co and Co alloys is hexagonal close packed (hcp) with uniaxial crystalline anisotropy and a magnetization easy direction along the c-axis that lies in the plane of the film. The better the in-plane c-axis crystallographic texture, the more suitable is the Co alloy thin film for use in longitudinal recording to achieve high remanance and coercive force. For very small grain sizes, coercivity increases with increased grain size. The large grains, however, result in greater noise. Accordingly, there is a need to achieve high coercivities without the increase in noise associated with large grains. In order to achieve low noise magnetic recording media, the Co alloy thin film should have uniform small grains with grain boundaries capable of magnetically isolating neighboring grains thereby decreasing intergranular exchange coupling. This type of microstructural and crystallographic control is typically attempted by manipulating the deposition process, and properly using of underlayers and seedlayers.

It is recognized that the magnetic properties, such as Hcr, Mr, S and SMNR, which are critical to the performance of a magnetic alloy film, depend primarily upon the microstructure of the magnetic layer, which, in turn, is influenced by the underlying layers, such as the underlayer. It is also recognized that underlayers having a fine grain structure are highly desirable, particularly for growing fine grains of hcp Co alloys deposited thereon.

For high signal to noise ratio (SNR) magnetic recording media, it is desirable to have a high signal in a very thin film. Higher signal can be achieved by increasing the saturation magnetization (Ms) of the material at the top of the magnetic layer, and correspondingly increasing the fringing magnetic field that provides signal. Prior art magnetic recording systems generally employ media including a magnetic layer alloy including Co and Cr, and other elements often including Pt, and B. These magnetic layer systems generally require 10-25% Cr, and often use 5-15% B in order to isolate the magnetic grains in the magnetic layer and reduce noise.

There exists a continuing need for high areal density magnetic recording media exhibiting high Hcr and high SMNR while overcoming the deficiencies of the prior art solutions. In general, tilted magnetic recording is expected to overcome the deficiencies of the prior art because the head writes more efficiently upon media with magnetic easy axis tilted at an angle out-of-plane of the media surface. The tilted media recording system should thus be able to use higher Hc media. Tilted c-axis $L_{10}$ structures can provide a high Hc tilted media.

SUMMARY OF THE INVENTION

The invention relates to a recording medium and method of manufacturing the medium. The medium comprises a magnetic layer comprising a magnetic material comprising an ordered, face-centered tetragonal (fct) $L_{10}$ structure having a c-axis of the fct $L_{10}$ structure magnetic layer at an angle, canted about 35° out-of-plane of the magnetic layer. The fct $L_{10}$ ordered structure is not based on a hcp structure but is based on a tetragonal structure. Current recording media designs utilize magnetization with easy axis either in the disk plane (longitudinal recording) or perpendicular to the disk plane (perpendicular recording) for storing data. This invention produces a recording medium with the easy magnetization axis lying about 35° tilted out-of-plane. Media SNR could be greatly improved from conventional longitudinal and perpendicular recording, because of an increase in the grain anisotropy that could be effectively written due to the angled recording configuration. A medium structure design to achieve this tilted magnetization configuration is disclosed. The medium of this invention could be used with a head designed for longitudinal or perpendicular recording.

One embodiment is a magnetic recording medium comprising (a) a magnetic layer comprising grains and (b) an underlayer comprising an underlayer material having a hcp or face-centered-cubic (fcc) lattice structure with a <0002> or <111> growth orientation, wherein at least two-thirds or more of the grains of the magnetic layer have a face-centered tetragonal (fct) $L_{10}$ lattice structure having a c-axis that is at an angle, canted out-of-plane of the magnetic layer. Preferably, the underlayer has substantially no material having a $L_{10}$ lattice structure and the unordered precursor material that is transformed into the $L_{10}$ magnetic layer comprises an alloy having a fcc <111> growth orientation and is selected from the group consisting of substantially equiatomic CoPt, FePt, CoPd and FePd and mixtures of those alloys. Preferably, the fcc magnetic layer precursor material is annealed to form a magnetic layer having elemental composition similar to the precursor and having the fct $L_{10}$ lattice structure. More preferably, the c-axis is canted about 35° out-of-plane of the magnetic layer, nearly parallel to a fcc <001> axis of an underlayer or prior precursor grain. In one variation, the lattice structure of the underlayer material substantially matches the fct $L_{10}$ lattice structure of the grains of the magnetic layer. Preferably, a mismatch between the hcp {0002} or {111} lattice plane of the underlayer material and the {111} plane of the fct $L_{10}$ lattice structure of the grains of the magnetic layer is less than 10%. In one variation, the underlayer is directly in contact with the magnetic layer. Preferably, the underlayer material is one of a hcp material and a fcc material, commonly including a Ru alloy, a Ag alloy, a Pt alloy, or a Pd alloy. More preferably, the underlayer is on an amorphous TiCr alloy.

Another embodiment is a method of manufacturing a magnetic recording medium comprising (a) depositing an underlayer comprising an underlayer material having a hcp or fcc lattice structure with a <0002> or <111> growth orientation on a substrate and (b) subsequently depositing a magnetic layer comprising grains on the substrate, wherein at least two-thirds or more of the grains have a fct $L_{10}$ lattice structure having a c-axis that is at an angle, canted out-of-plane of the magnetic layer.

Still another embodiment is a magnetic recording medium, comprising a substrate and means for producing an easy magnetization axis tilted away from a plane of the substrate. The means for producing an easy magnetization axis tilted away from the plane of the substrate surface are disclosed in several embodiments described below.

As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

In this application, the word "containing" means that the layer comprises the elements or compounds before the word "containing," but the layer could still include other elements and compounds. Also, in this application, E-containing alloy and E alloy mean the same, where E is any element.

The recording medium of the invention may be a rigid magnetic disc rotatable about an axis that is incorporated into a disc drive shown in FIG. 1. Disc drives such as this are standard equipment in the industry. See, Mee, C. D. and Daniel, E. D., MAGNETIC RECORDING, Vols. I-III (McGraw-Hill pub. 1987); F. Jorgenson, The Complete Handbook of Magnetic Recording, Chapter 16 (3rd. ed. 1988), and U.S. Pat. No. 5,062,021, the relevant disclosures of which are incorporated herein by reference. The magnetic recording medium of the present invention may also be used with flexible magnetic discs or tapes using known flexible substrates.

Signal to noise ratio (SNR) of magnetic recording can be improved by increasing the maximum media coercivity for which a head can write magnetic transitions onto the media. It has been proposed in a related application Ser. No. 10/611,308 that media can be written at much higher coercivity when having magnetic grains with magnetic easy axis at an angle tilted near 45° away from the applied magnetic field. It is thus desirable to form high anisotropy magnetic recording media with easy axis tilted off of the film growth normal by a uniform amount, preferably near 45°.

This invention provides a magnetic recording medium suitable for high areal recording density exhibiting high thermal stability and high SMNR. This invention achieves such technological advantages by using high anisotropy compositionally ordered, face-centered tetragonal (fct) $L_{10}$ structures such as CoPt, FePt, CoPd, FePd and their alloys. These materials have their easy axis parallel to the long c-axis of the tetragonal structure, <001> and grow with the c-axis in-plane for longitudinal recording or out-of-plane for perpendicular recording. In this invention, these materials and similar materials are utilized such that the c-axis of the fct $L_{10}$ structure of the magnetic layer is oriented at an angle, canted about 35° out-of-plane. Some embodiments of the invention enable tilted magnetic recording of a high coercivity magnetic medium by a perpendicular recording head.

Figure 4A:
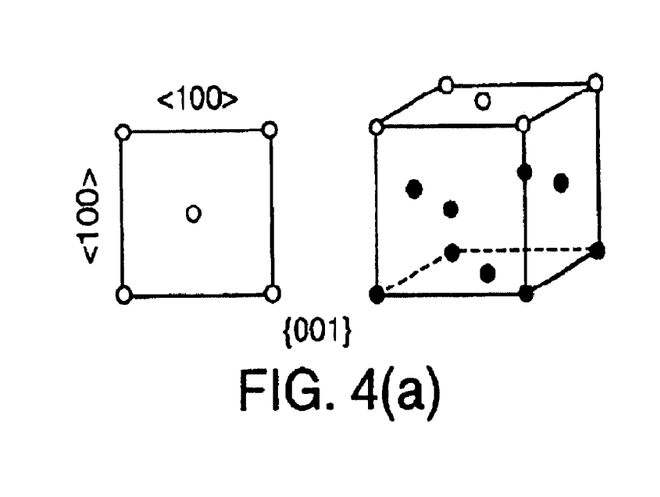
FIG. 4 shows crystal lattice planes of a face-centered cubic structure.
Figure 4B:
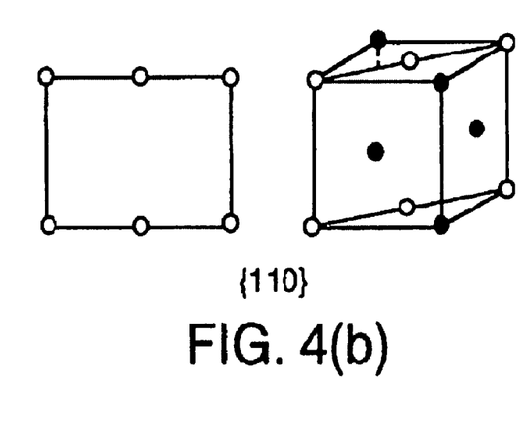
Figure 4C:
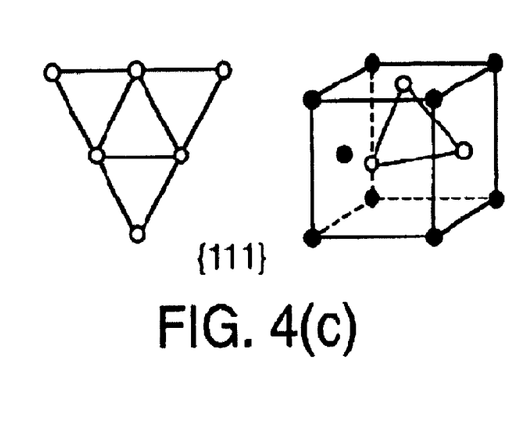

Different crystallographic lattice planes of the hcp lattice of Co are shown in FIG. 3. FIG. 4 shows different lattice planes to the fcc lattice. By using an appropriate underlayer, an fcc layer in a <111> growth orientation or an hcp layer in a <0002> growth orientation is grown by epitaxy or by graphoepitaxy, or by closest packed planes of the fcc or hcp layer having lowest interface energy with the substrate. The face centered cubic structure shown in FIG. 4 encompasses pure elements having a fcc structure, as well as solid solutions of those pure elements and alloys. $L_{10}$ is not a cubic structure. $L_{10}$ is a derivative structure of fcc, which is not fcc lattice structure and has a c-axis that is at an angle, canted out-of-plane of the magnetic layer. Orienting the fcc precursor with the fcc underlayer so that the resulting special c-axis of the transformed $L_{10}$ aligns with the fcc cube face of the underlayer is one important aspect of this invention.

As shown in FIGS. 3 and 4, the hcp {0002} and fcc {111} lattice planes comprise identical 2-dimensional structures, close-packed planes. Materials such as equiatomic CoPt, FePt, CoPd, FePd and mixtures thereof, can have a fcc crystal structure after sputter deposition at temperatures below 400° C. These materials, when grown on an appropriately lattice matched underlayer {0002} or {111} close-packed-plane, can thus be made to have a <111> growth orientation.

Materials such as CoPt, FePt, CoPd, FePd transform from fcc to an ordered tetragonal $L_{10}$ structure at high temperature, often above about 600° C. During the fcc to fct transition, the fcc {111} close-packed-plane is distorted into a lower symmetry closest packed fct {111} plane, but the fct <111> direction is maintained parallel to the pre-transformation fcc <111> growth direction. Thus, the resulting transformed fct $L_{10}$ structure also has its <001> c-axis nearly parallel to a pre-transformation <001> axis.

A protective overcoat layer generally is deposited subsequent to the magnetic layer. The thickness of the protective layer could be about 10 Å to about 100 Å, preferably less than about 40 Å. The protective layer could be a carbon-containing layer, and may in some embodiments be made of hydrogenated carbon, nitrogenated carbon, hybrid carbon, or a combination of them.

The carbon overcoat could be further coated with a lubricant layer generally 1 nm to 2 nm thick. The lubricant is preferably a fluorocarbon or a perfluoroether. Examples include $CCl_2FCClF_2$, $CF_3(CF_2)_4CF_3$, $CF_3(CF_2)_5CF_3$, $CF_3(CF_2)_{10}CF_3$, and $CF_3(CF_2)_{16}CF_3$.

The substrates that may be used in the invention include Al, glass, glass-ceramic, plastic/polymer material, ceramic, glass-polymer or composite materials.

The magnetic recording medium has a remanent coercivity of about 5,000 to about 10,000 Oersted, and an Mrt (product of remanance, Mr, and magnetic layer thickness, (t) of about 0.2 to about 2.0 memu/cm². In a preferred embodiment, the Mrt is about 0.25 to about 1 memu/cm².

EXAMPLES

The examples relate to a method and apparatus for a magnetic recording medium with a magnetic layer having high Ms and low noise. All samples described in this disclosure could be fabricated by sputtering such as CVD, ion beam, or DC magnetron sputtering.

Figure 5:
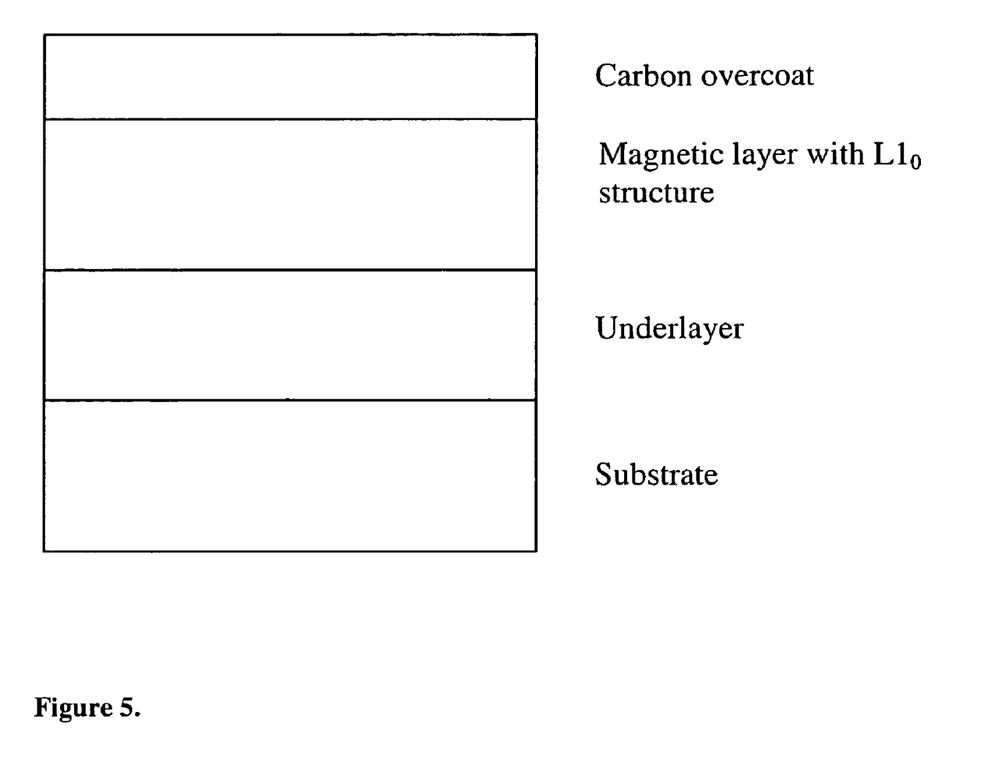
FIG. 5 shows embodiments of the film structure according to the current invention.
Figure 5A:
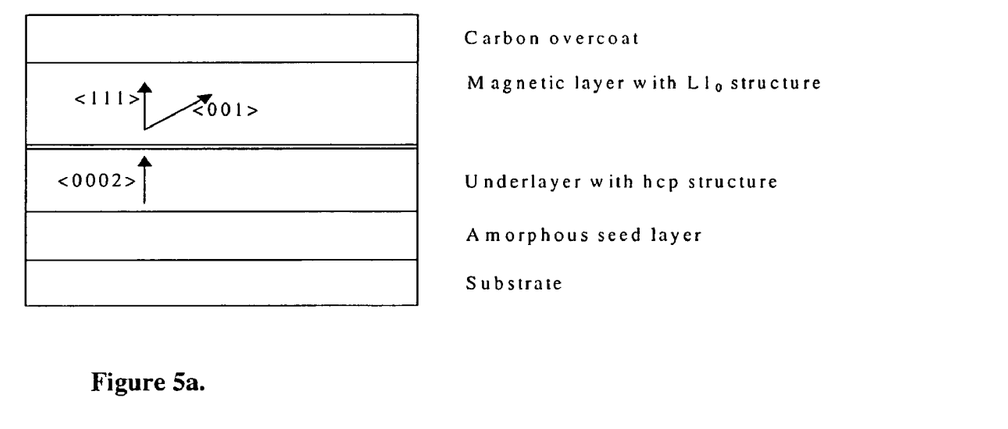

Examples of the film structure of the magnetic recording medium in accordance with the present invention are shown in FIG. 5. In one embodiment (FIG. 5a) an hcp layer having a {0002} lattice parameter and a <0002> growth orientation is deposited upon an amorphous metallic underlayer on a substrate. An example of such a structure is a Ru alloy deposited upon an amorphous TiCr alloy. A material having a {111} lattice parameter similar to the {0002} lattice parameter, and capable of transforming into an ordered $L_{10}$ structure is deposited with a <111> growth orientation. Examples of such materials are substantially equiatomic CoPt, FePt, CoPd, and FePd alloys. Such materials may be deposited as a single layer or a multilayer of disparate composition such as single elements. The canted $L_{10}$ structure is then formed by annealing, so that the magnetically easy $L_{10}$ <001> direction is tilted parallel to a prior fcc <001> cube face direction, and away from the prior vertical fcc <111> growth direction.

Figure 5B:
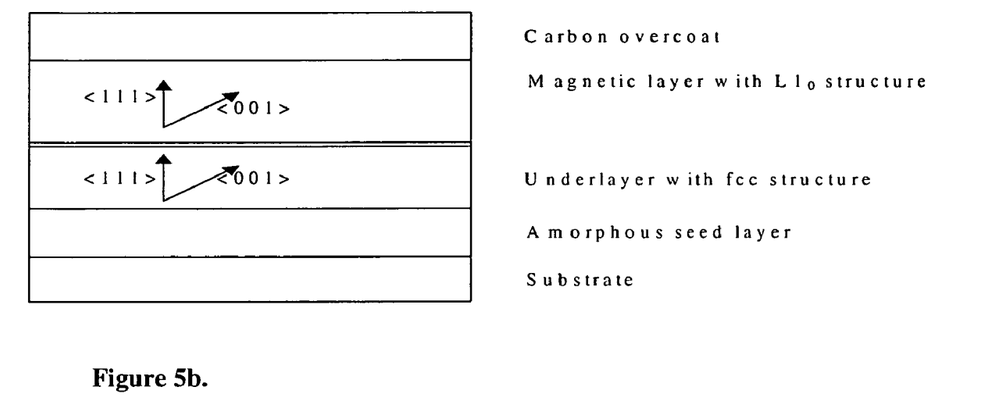

In a second embodiment (FIG. 5b) an fcc layer having a first {111} lattice parameter and a <111> growth orientation is deposited upon an amorphous metallic underlayer on a substrate. An example of such a structure is one of an Ag, a Pt, and a Pd alloy deposited upon an amorphous TiCr alloy. A material having a second {111} lattice parameter similar to the first {111} lattice parameter, and capable of transforming into an ordered $L_{10}$ structure is deposited with a <111> growth orientation. Examples of such materials are substantially equiatomic CoPt, FePt, CoPd, and FePd alloys. Such materials may be deposited as a single layer or a multilayer of disparate composition such as single elements. The canted $L_{10}$ structure is then formed by annealing, so that the magnetically easy <001> direction is tilted parallel to a prior fcc <001> cube face direction, and away from the vertical <111> direction.

In these examples, the close-packed planes of the underlayer match very well with the closest-packed planes of the $L_{10}$ structure with less than 10%, and in most cases, less than 6% mismatch. One measure of mismatch between two materials containing such close-packed or nearly close-packed planes is $2*(s1-s2)/(s1+s2)$, where s1 and s2 are the nearest-neighbor atomic spacings in each material. Also, the magnetic layer according to these examples contains more than about two-thirds of its grains having a tilted c-axis and an $L_{10}$ structure, the remaining grains having an fcc structure. In other embodiments, the magnetic layer contains more than 75% grains having $L_{10}$ structure, the remaining grains having an fcc structure. Preferably, the magnetic layer should contain more than 85% to 95% grains having $L_{10}$ structure, the remaining grains having an fcc structure. Preferably substantially all grains are oriented with a tilted c-axis.

The steps for manufacturing the medium are: (1) Depositing an underlayer for $L_{10}$ precursor growth, having a basal plane lattice parameter similar to the {111} lattice parameter of the $L_{10}$ precursor magnetic layer to be used, and orienting underlayer(s) on a substrate. (2) Depositing an alloy capable of transforming into an $L_{10}$ structure with a <111> growth orientation, to form the magnetic layer. $L_{10}$ structure generally requires nearly equiatomic alloys or mixtures where one atom or type of atom takes "A" sites and the other atom type takes "B" sites. Example mixtures include $Fe_{25}Co_{25}Pt_{50}$, where Fe and Co atoms take "A" sites while Pt takes on "B" sites; and $Fe_{50}Pt_{40}Pd_{10}$, where Fe fills "A" sites and Pt and Pd share "B" sites. This is the ordering process. (3) Annealing as necessary to form the $L_{10}$ ordered structure, with <001> axis canted at about 55° away from the <111> growth orientation. (4) Depositing a protective overcoat. The annealing temperature would be in the range of about 400-1,400° C., preferably about 500-600° C. Annealing time could vary from 10 seconds to 12 hours, preferably for shorter times to increase throughput and reduce grain growth.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations that can be practiced throughout the disclosed numerical ranges. Finally, the entire disclosure of the patents and publications referred in this application are hereby incorporated herein by reference.

The invention claimed is:

1. A magnetic recording medium comprising (a) a magnetic layer comprising grains and (b) an underlayer comprising an underlayer material having a hexagonal-closed-packed (hcp) or face-centered-cubic (fcc) lattice structure with a <0002> or <111> growth orientation, wherein at least two-thirds or more of the grains of said magnetic layer have a derivative structure of fcc that is not a fcc lattice structure, the derivative structure having a c-axis that is at an angle, canted out-of-plane of the magnetic layer, wherein the underlayer material is one of a Ru alloy, a Ag alloy, a Pt alloy, and a Pd alloy.

2. The magnetic recording medium of claim 1, wherein the underlayer has substantially no material having a $L_{10}$ lattice structure and the magnetic layer precursor material is an alloy having a <111> growth orientation and is selected from the group consisting of substantially equiatomic CoPt, FePt, CoPd and FePd, and mixtures thereof.

3. The magnetic recording medium of claim 1, wherein the magnetic layer precursor is annealed to form the magnetic layer comprising fct $L_{10}$ lattice structure.

4. The magnetic recording medium of claim 1, wherein the derivative structure is a face-centered tetragonal (fct) $L_{10}$ and the c-axis is canted about 35° out-of-plane of the magnetic layer.

5. The magnetic recording medium of claim 3, wherein the c-axis is canted about 35° out-of-plane of the magnetic layer.

6. The magnetic recording medium of claim 1, wherein the lattice structure of the close-packed planes of the underlayer material substantially matches the {111} planes of the fct $L_{10}$ lattice structure of the grains of the magnetic layer.

7. The magnetic recording medium of claim 6, wherein a mismatch between the lattice structure of the underlayer material and that of the fct $L_{10}$ lattice structure of the magnetic layer is less than 10%.

8. The magnetic recording medium of claim 1, wherein the underlayer is directly in contact with the magnetic layer.

9. The magnetic recording medium of claim 1, wherein the underlayer is on an amorphous TiCr alloy.

10. A magnetic recording medium comprising (a) a magnetic layer comprising grains and (b) an underlayer comprising an underlayer material having a hexagonal-closed-packed (hcp) with a <0002> growth orientation, wherein at least two-thirds or more of the grains of said magnetic layer have a derivative structure of fcc that is not a fcc lattice structure, the derivative structure having a c-axis that is at an angle, canted out-of-plane of the magnetic layer.

11. The magnetic recording medium of claim 10, wherein the underlayer has substantially no material having a $L_{10}$ lattice structure and the magnetic layer precursor material is an alloy having a <111> growth orientation and is selected from the group consisting of substantially equiatomic CoPt, FePt, CoPd and FePd, and mixtures thereof.

12. The magnetic recording medium of claim 10, wherein the magnetic layer precursor is annealed to form the magnetic layer comprising fct $L_{10}$ lattice structure.

13. The magnetic recording medium of claim 10, wherein the derivative structure is a face-centered tetragonal (fct) $L_{10}$ and the c-axis is canted about 35° out-of-plane of the magnetic layer.

14. The magnetic recording medium of claim 12, wherein the c-axis is canted about 35° out-of-plane of the magnetic layer.

15. The magnetic recording medium of claim 10, wherein the lattice structure of the close-packed planes of the underlayer material substantially matches the {111} planes of the fct $L_{10}$ lattice structure of the grains of the magnetic layer.

16. The magnetic recording medium of claim 15, wherein a mismatch between the lattice structure of the underlayer material and that of the fct $L_{10}$ lattice structure of the magnetic layer is less than 10%.

17. The magnetic recording medium of claim 10, wherein the underlayer is directly in contact with the magnetic layer.

* * * * *